United States Patent
Chen et al.

(10) Patent No.: US 11,871,354 B2
(45) Date of Patent: Jan. 9, 2024

(54) POWER CONTROL METHOD AND APPARATUS

(71) Applicant: HUAWEI TECHNOLOGIES CO., LTD., Guangdong (CN)

(72) Inventors: Lei Chen, Shenzhen (CN); Fengwei Liu, Chengdu (CN); Jing Qiu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/942,957

(22) Filed: Sep. 12, 2022

(65) Prior Publication Data

US 2023/0059595 A1 Feb. 23, 2023

Related U.S. Application Data

(63) Continuation of application No. 16/918,775, filed on Jul. 1, 2020, now Pat. No. 11,457,413, which is a (Continued)

(30) Foreign Application Priority Data

Jan. 25, 2018 (CN) .................... 201810074307.4

(51) Int. Cl.
*H04W 52/14* (2009.01)
*H04B 7/0426* (2017.01)
(Continued)

(52) U.S. Cl.
CPC ........ *H04W 52/143* (2013.01); *H04B 7/0426* (2013.01); *H04L 1/0003* (2013.01);
(Continued)

(58) Field of Classification Search
None
See application file for complete search history.

(56) References Cited

U.S. PATENT DOCUMENTS

2010/0273515 A1 10/2010 Fabien et al.
2013/0034070 A1 2/2013 Seo et al.
(Continued)

FOREIGN PATENT DOCUMENTS

CN 102281571 12/2011
CN 103238360 8/2013
(Continued)

OTHER PUBLICATIONS

3GPP TS 38.473 V15.0.0, "3rd Generation Partnership Project; Technical Specification Group Radio Access Network; NG-RAN; F1 application protocol (F1AP) (Release 15)," Dec. 2017, 90 pages.
(Continued)

*Primary Examiner* — Jenkey Van
(74) *Attorney, Agent, or Firm* — Fish & Richardson P.C.

(57) ABSTRACT

This application discloses example power control methods and apparatuses. One example method includes receiving, by a first node, first information sent by a second node, where the first information is used to determine a first transmit power, where the first transmit power is a power used when the first node sends downlink information to the second node through a first link, where the first link is a link between the first node and the second node, and where the first node is an upper-level device of the second node. The first node can then determine the first transmit power based on the first information.

20 Claims, 4 Drawing Sheets

Related U.S. Application Data continuation of application No. PCT/CN2019/072239, filed on Jan. 17, 2019.

(51) Int. Cl.
*H04L 1/00* (2006.01)
*H04W 52/24* (2009.01)
*H04W 52/32* (2009.01)
*H04W 52/36* (2009.01)

(52) U.S. Cl.
CPC ....... *H04W 52/242* (2013.01); *H04W 52/325* (2013.01); *H04W 52/367* (2013.01)

(56) References Cited

U.S. PATENT DOCUMENTS

| | | | |
|---|---|---|---|
| 2013/0273926 A1 | 10/2013 | Peng et al. | |
| 2016/0081033 A1 | 3/2016 | Ouchi et al. | |
| 2017/0086147 A1 | 3/2017 | Zhang et al. | |
| 2018/0092139 A1* | 3/2018 | Novlan | H04W 8/005 |
| 2019/0132847 A1* | 5/2019 | Abedini | H04W 52/38 |
| 2019/0158319 A1 | 5/2019 | Cezanne et al. | |

FOREIGN PATENT DOCUMENTS

| | | |
|---|---|---|
| CN | 103916901 | 7/2014 |
| CN | 103945504 | 7/2014 |
| CN | 105530692 | 4/2016 |
| CN | 107548144 | 1/2018 |
| CN | 106171016 | 8/2019 |
| CN | 107005942 | 4/2020 |
| EP | 2709408 | 3/2014 |
| EP | 2744277 | 6/2014 |
| EP | 3276902 | 1/2018 |
| WO | 2017143536 | 8/2017 |

OTHER PUBLICATIONS

3GPP TS 38.423 V0.5.0, "3rd Generation Partnership Project; Technical Specification Group Radio Access Network; NG Radio Access Network (NG-RAN); Xn application protocol (XnAP) (Release 15)" Dec. 2017, 67 pages.
3GPP TS 38.213 V15.0.0, "3rd Generation Partnership Project; Technical Specification Group Radio Access Network; NR; Physical layer procedures for control (Release 15)," Dec. 2017, 56 pages.
3GPP TS 38.214 V15.0.0, "3rd Generation Partnership Project; Technical Specification Group Radio Access Network; NR; Physical layer procedures for data (Release 15)," Dec. 2017, 71 pages.
3GPP TS 38.321 V15.0.0, "3rd Generation Partnership Project; Technical Specification Group Radio Access Network; NR; Medium Access Control (MAC) protocol specification (Release 15)," Dec. 2017, 55 pages.
3GPP TS 38.331 V15.0.0, "3rd Generation Partnership Project; Technical Specification Group Radio Access Network NR Radio Resource Control (RRC) protocol specification (Release 15)," Dec. 2017, 188 pages.
Extended European Search Report issued in European Application No. 19743843.5 dated Jan. 25, 2021, 22 pages.
Office Action in European Appln. No. 19743843.5, dated Nov. 17, 2022, 7 pages.
Office Action issued in Chinese Application No. 201810074307.4 dated Apr. 9, 2020, 23 pages (with English translation).
Office Action issued in Chinese Application No. 201810074307.4 dated Mar. 26, 2021, 8 pages.
PCT International Search Report and Written Opinion issued in International Application No. PCT/CN2019/072239 dated Apr. 8, 2019, 10 pages (with English translation).

\* cited by examiner

POWER CONTROL METHOD AND APPARATUS

CROSS-REFERENCE TO RELATED APPLICATIONS

This application is a continuation of U.S. patent application Ser. No. 16/918,775, filed on Jul. 1, 2020, which is a continuation of International Application No. PCT/CN2019/072239, filed on Jan. 17, 2019, which claims priority to Chinese Patent Application No. 201810074307.4, filed on Jan. 25, 2018. All of the afore-mentioned patent applications are hereby incorporated by reference in their entireties.

TECHNICAL FIELD

This application relates to the field of wireless communications technologies, and in particular, to a power control method and apparatus.

BACKGROUND

A relay technology is introduced to a 4G long term evolution (LTE) system. A relay node (RN) is deployed in a network to forward data between a base station and a terminal device, to increase a network capacity and resolve a coverage hole. A simple network topology is shown in FIG. 1. A link between a donor eNB (DeNB) and an RN is referred to as a backhaul link, and a link between the RN and a terminal device is referred to as an access link.

In a 5G new radio (NR) system, the relay technology is still supported. A concept of integrated access and backhaul (IAB) is introduced to the NR. Compared with relaying in LTE, the IAB needs to be more flexible to support resource sharing of an access link and a backhaul link. FIG. 2 is a possible schematic diagram of signal transmission in IAB. Signal transmission between a donor gNB and a relay transmission/reception point (rTRP) 1, signal transmission between the rTRP 1 and an rTRP 2, and signal transmission between the rTRP 1 and a terminal device may be performed by flexibly sharing resources.

In the foregoing 4G LTE system or 5G NR system, in a scenario in which an rTRP (or an RN) simultaneously receives a downlink signal on a backhaul link, an uplink signal on an access link, and/or an uplink signal on a next-hop backhaul link, if a power difference between the three signals is excessively large, severe interference between the three signals may be caused. Consequently, correct demodulation of the three signals by the rTRP (or the RN) is affected.

As shown in FIG. 3, for example, in a 5G NR system, a next-hop rTRP of an rTRP 1 is an rTRP 2. It is assumed that a receive power of a downlink signal (that is, a downlink signal sent by a donor gNB to the rTRP 1) on a backhaul link received by the rTRP 1 is P1, a receive power of an uplink signal (that is, an uplink signal sent by a terminal device to the rTRP 1) on an access link received by the rTRP 1 is P3, and a receive power of an uplink signal (that is, an uplink signal sent by the rTRP 2 to the rTRP 1) on a next-hop backhaul link received the rTRP 1 is P2. If a power difference between P1, P2, and P3 is excessively large, severe interference between the three signals may be caused. Therefore, power control needs to be performed on signal transmission corresponding to each of the three links. In the prior art, for example, in an LTE protocol, a power control mechanism is defined for uplink signal transmission. The mechanism may continue to be applicable to downlink signal transmission on the access link and uplink signal transmission on the next-hop backhaul link in FIG. 3. However, in the prior art, there is no power control mechanism for downlink signal transmission on the backhaul link.

SUMMARY

Embodiments of this application provide a power control method and apparatus, to provide a mechanism for performing power control on downlink signal transmission on a backhaul link, and reduce interference between signals received by a relay device.

According to a first aspect, an embodiment of this application provides a power control method. The method includes:

receiving, by a first node, first information sent by a second node, where the first information is used to determine a first transmit power; and determining, by the first node, the first transmit power based on the first information. The first transmit power is a power used when the first node sends downlink information to the second node through a first link, the first link is a link between the first node and the second node, and the first node is an upper-level device of the second node.

According to the foregoing method, the first node determines the first transmit power based on the first information sent by the second node, and the first node uses the first transmit power when sending the downlink information to the second node through the first link, so that interference between signals received by the second node can be reduced.

In a possible design, the first information includes a reference receive power or a power adjustment value.

When the first information includes the reference receive power, the first node determines the first transmit power based on the reference receive power and a path loss measurement value corresponding to the first link.

The reference receive power is determined by the second node based on at least one of parameters: a preset bandwidth, a preset MIMO configuration parameter, and a preset MCS value. When the second node updates the preset MIMO configuration parameter, the second node updates the reference receive power based on the updated preset MIMO configuration parameter. In addition, the reference receive power may alternatively be a normalized reference receive power. Therefore, when an actual downlink bandwidth, MCS, and preset MIMO configuration parameter of a backhaul link are different from the parameter used by the second node to determine the reference receive power, an actual reference receive power may be determined by scaling the reference receive power.

When the first information includes the power adjustment value, the first node determines an adjusted first transmit power based on a latest used first transmit power and power adjustment value.

The power adjustment value is determined by the second node based on a difference between a receive power of a preset signal that is obtained through measurement and the reference receive power, and the preset signal is a signal that carries latest downlink information that is sent by the first node to the second node through the first link, or a reference signal sent by the first node to the second node. The reference signal may be a CSI-RS used for CSI measurement or a DMRS, and the CSI-RS used for the CSI measurement is a CSI-RS used to measure parameters such as a precoding matrix indicator (PMI), a channel quality indicator (CQI), and a rank indicator (RI). The CSI-RS and a CSI-RS used for radio resource management are two types of CSI-RSs for different purposes.

In a possible design, the first information includes a power control parameter $P_0$, a path loss compensation coefficient $\alpha$ corresponding to the first link, and a power adjustment value, and the power adjustment value is used to update an accumulated value f of the power adjustment value.

In a possible design, the determining, by the first node, the first transmit power based on the first information includes:

determining, by the first node, the first transmit power $P_{BH}$ according to the following formula:

$$P_{BH} = \min\left\{\begin{matrix}P_{CMAX},\\ 10\log_{10}(M_{BH}) + P_0 + \alpha \cdot PL + \Delta_{TF} + f\end{matrix}\right\},$$

where $P_{CMAX}$ is a maximum downlink transmit power corresponding to the first link, $M_{BH}$ is a downlink bandwidth corresponding to the first link, $\Delta_{TF}$ is a correction value of a preset modulation and coding scheme, and PL is a path loss measurement value corresponding to the first link.

Therefore, a power control manner provided in the foregoing formula is a closed-loop power control manner.

In a possible design, the first information includes a power control parameter $P_0$, and a path loss compensation coefficient $\alpha$ corresponding to the first link.

In a possible design, the determining, by the first node, the first transmit power based on the first information includes:

determining, by the first node, the first transmit power $P_{BH}$ according to the following formula:

$$P_{BH} = \min\left\{\begin{matrix}P_{CMAX},\\ 10\log_{10}(M_{BH}) + P_0 + \alpha \cdot PL + \Delta_{TF}\end{matrix}\right\},$$

where $P_{CMAX}$ is a maximum downlink transmit power corresponding to the first link, $M_{BH}$ is a downlink bandwidth corresponding to the first link, $\Delta_{TF}$ is a correction value of a preset modulation and coding scheme, and PL is a path loss measurement value corresponding to the first link.

Therefore, a power control manner provided in the foregoing formula is an open-loop power control manner.

In a possible design, the first information further includes the path loss measurement value PL corresponding to the first link.

The path loss measurement value corresponding to the first link is determined by the second node based on a transmit power of a first signal sent by the first node and a receive power of the first signal obtained by the second node through measurement.

The first signal is any one of the following signals: a DMRS, a CSI-RS, or a synchronization signal.

In a possible design, the path loss measurement value corresponding to the first link is determined by the first node based on a transmit power of a second signal sent by the second node and a receive power of the second signal obtained by the first node through measurement.

The second signal is an SRS, a DMRS, a CSI-RS, or a synchronization signal.

In a possible design, the first transmit power is the same as or differs by a preset threshold from a power used when the first node sends a reference signal or control information to the second node.

The reference signal herein may be at least one of the following: a DMRS, a TRS, a PTRS, and a CSI-RS used to obtain CSI.

Optionally, the preset threshold herein is determined based on a quantity of ports of the reference signal and a quantity of transport streams corresponding to the downlink information.

In a possible design, the first transmit power is not used as a transmit power of a CSI-RS used for beam measurement, a CSI-RS used for mobility management, and a CSI-RS used for link quality monitoring, and a transmit power of a signal that has no association relationship with a channel carrying the downlink information. The transmit powers may be directly configured by the first node.

In a possible design, a time resource unit used by the first node to send the downlink information to the second node through the first link is the same as or partially overlaps a time resource unit used by a third node to send uplink information to the second node through a second link, the second link is a link between the second node and the third node, and the third node is a lower-level node of the second node or a terminal device.

Therefore, the method provided in this embodiment of this application can be applied to a scenario in which the second node simultaneously receives the downlink information sent by the first node and the uplink information sent by the third node. It should be understood that in this embodiment of this application, an objective of performing power control on downlink transmission on the backhaul link is to avoid mutual interference with simultaneous uplink transmission on an access link or uplink transmission on a next-hop backhaul link. However, not all time resource units are applied to simultaneous downlink transmission on the backhaul link and uplink transmission on the access link or uplink transmission on the next-hop backhaul link. For the time resource units that are not multiplexed, power control may not be required for the downlink transmission on the backhaul link, or another power control method may be used.

According to a second aspect, an embodiment of this application provides a power control method. The method includes:

determining, by the second node, first information, and sending, by the second node, the first information to the first node. The first information is used to determine a first transmit power, the first transmit power is a power used when the first node sends downlink information to the second node through a first link, the first link is a link between the first node and the second node, and the first node is an upper-level device of the second node.

According to the foregoing method, the second node sends the first information to the first node, so that the first node determines the first transmit power, and the first node uses the first transmit power when sending the downlink information to the second node through the first link, so that interference between signals received by the second node can be reduced.

In a possible design, the first information is a reference receive power or a power adjustment value.

Therefore, the second node may determine the reference receive power or the power adjustment value, and notify the first node of the reference receive power or the power adjustment value.

In a possible design, the first information includes a power control parameter $P_0$, a path loss compensation coefficient $\alpha$ corresponding to the first link, and a power adjustment value, and the power adjustment value is used to update an accumulated value f of the power adjustment value.

Therefore, the second node may send parameter information required for closed-loop power control to the first node, so that the first node implements the closed-loop power control on the first transmit power.

In a possible design, the first information includes a power control parameter $P_0$ and a path loss compensation coefficient α corresponding to the first link.

Therefore, the second node may send parameter information required for open-loop power control to the first node, so that the first node implements the open-loop power control on the first transmit power.

In a possible design, the first information further includes a path loss measurement value PL corresponding to the first link.

Therefore, the second node may notify the first node of the determined path loss measurement value PL corresponding to the first link.

In a possible design, the method further includes: updating, by the second node, a preset MIMO configuration parameter; and updating, by the second node, the reference receive power based on the updated preset MIMO configuration parameter.

Therefore, the second node can update the reference receive power in a timely manner, to meet a requirement of accurately determining the first transmit power by the first node.

In a possible design, a time resource unit used by the first node to send the downlink information to the second node through the first link is the same as or partially overlaps a time resource unit used by a third node to send uplink information to the second node through a second link, the second link is a link between the second node and the third node, and the third node is a lower-level node of the second node or a terminal device.

Therefore, the method provided in this embodiment of this application can be applied to a scenario in which the second node simultaneously receives the downlink information sent by the first node and the uplink information sent by the third node.

According to a third aspect, this application provides a network node. The network node includes a transceiver, a processor, and a memory. The memory is configured to store a computer program, and the processor invokes the computer program stored in the memory, to perform, by using the transceiver, the method according to any one of the first aspect or the possible designs of the first aspect, or perform, by using the transceiver, the method according to any one of the second aspect or the possible designs of the second aspect.

For specific execution steps, refer to the first aspect and the second aspect. Details are not described herein again.

According to a fourth aspect, this application provides a power control apparatus, to perform the method according to any one of the first aspect or the possible designs of the first aspect. Specifically, the apparatus includes units configured to perform the method according to any one of the first aspect or the possible designs of the first aspect.

According to a fifth aspect, this application provides a power control apparatus, to perform the method according to any one of the second aspect or the possible designs of the second aspect. Specifically, the apparatus includes units configured to perform the method according to any one of the second aspect or the possible designs of the second aspect.

According to a sixth aspect, this application further provides a computer-readable storage medium. The computer-readable storage medium stores a computer program, and when the computer program is run on a computer, the computer is enabled to perform the method according to the foregoing aspects.

According to a seventh aspect, this application further provides a computer program product including a program. When the computer program product is run on a computer, the computer is enabled to perform the method according to the foregoing aspects.

DESCRIPTION OF EMBODIMENTS

Embodiments of this application are applicable to a cellular system having a relay device, and a scenario in which single-hop relay and multi-hop relay are supported, and a same spectrum resource is used on a backhaul link and an access link.

In a multi-hop relay network, one relay device may be connected to a donor base station (for example, a DgNB or a DeNB), or may be connected to another relay device. To distinguish a backhaul link between the relay device and a relay device, a relay device in a control role (or having a relatively small hop count to the donor base station) is referred to as an upper-level relay device, and a relay device in a controlled role (or having a relatively large hop count to the donor base station) is referred to as a low-level relay device. The backhaul link is a link between the donor base station or the upper-level relay device and the lower-level relay device. The access link is a link between the donor base station or the relay device and a terminal device.

The donor base station is an eNB or a gNB that provides a backhaul service for a lower-level node, and may also be referred to as a source base station or a donor base station. Typically, the donor base station is directly connected to a core network, and does not need to relay a signal in a wireless relay manner by using another access network device. The donor base station herein may be an evolved NodeB (eNodeB), a base station in a 5G mobile communications system, a next generation NodeB (gNB), a base station in a future mobile communications system, or the like.

The relay device may be an RN in a 4G LTE system, an rTRP, an RN, an IAB node in a 5G NR system, a relay device in a future mobile communications system, or the like.

A terminal device in the embodiments of this application may also be referred to as a terminal, user equipment (UE), a mobile station (MS), a mobile terminal (MT), or the like. The terminal device may be a mobile phone, a tablet computer (Pad), a computer having a wireless transmitting and receiving function, a virtual reality (VR) terminal device, an augmented reality (AR) terminal device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like.

Figure 1:
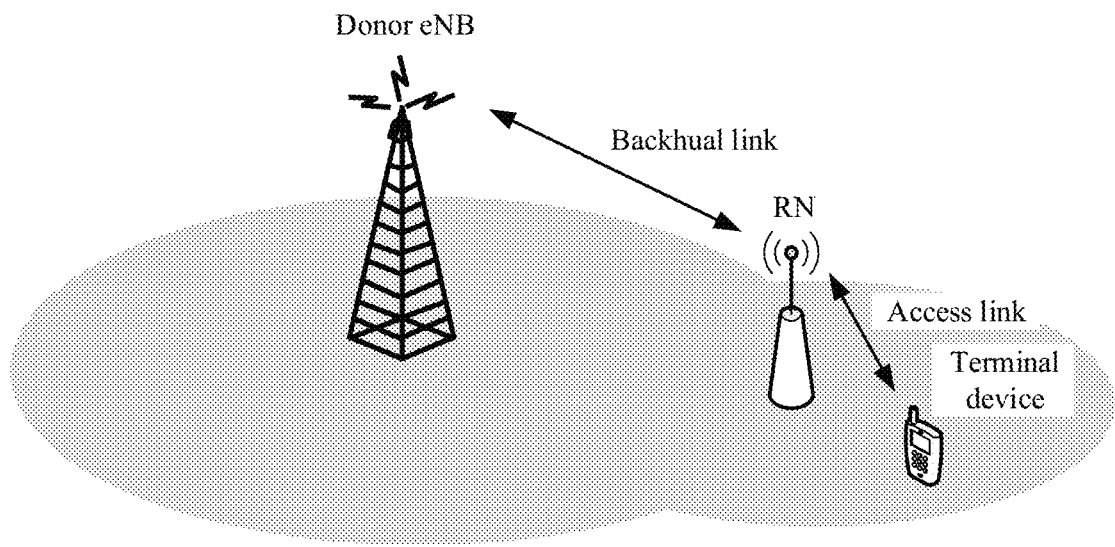
FIG. 1 is a schematic diagram of a network topology of an LTE relay network according to an embodiment of this application.
Figure 2:
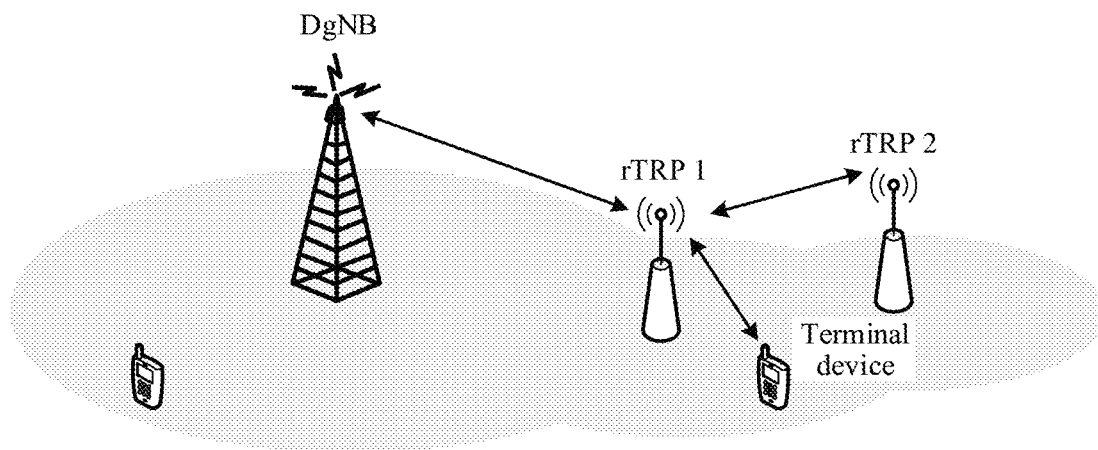
FIG. 2 is a schematic diagram of an IAB network topology of an NR network according to an embodiment of this application.

For example, as shown in FIG. 2, a DgNB is an upper-level node of an rTRP 1, and the rTRP 1 is an upper-level node of an rTRP 2. The rTRP2 is connected to the DgNB through two hops.

In the embodiments of this application, signal transmission between a first node and the terminal device relates to at least three nodes: the first node, a second node, and the terminal device. The first node is a previous-hop device, an upper-level node, a parent node, a parent node, a serving base station, or an upstream node of the second node. The second node is a next-hop device, a lower-level node, a child node, or a downstream node of the first node. The second node is a previous-hop device, an upper-level node, a parent node, a parent node, a serving base station, or an upstream node of a third node. The third node is a next-hop device, a lower-level node, a child node, a terminal, or a downstream node of the second node. The first node may be a donor base station or a relay device, the second node may be a relay device, and the third node may be a relay device or a terminal device. For example, if the first node is a donor base station, the second node is a next-hop relay device of the first node, and the third node is a terminal device that accesses the second node. For another example, if the first node is a relay device, the second node is a next-hop relay device of the first node, and the third node is a terminal device that accesses the second node.

A first link is a link between the first node and the second node, and the first node is an upper-level device of the second node. A second link is a link between the second node and the third node, and the third node is a lower-level device of the second node or a terminal device.

It should be understood that in the embodiments of this application, an objective of performing power control on downlink transmission on a backhaul link is to avoid mutual interference with simultaneous downlink transmission on an access link or uplink transmission on a next-hop backhaul link. However, not all time resource units are applied to simultaneous downlink transmission on the backhaul link and uplink transmission on the access link or uplink transmission on the next-hop backhaul link. For example, when only the downlink transmission on the backhaul link exists in a particular slot without transmission on the access link or the next-hop backhaul link, and in this case, because there is no problem of interference between a plurality of links, interference of the uplink transmission on the access link or the uplink transmission on the next-hop backhaul link does not need to be considered for the downlink transmission on the backhaul link, so that power control does not need to be performed on the downlink transmission on the backhaul link, or another power control method may be used. Therefore, the first node and the second node may first agree on time resource units that need to be used in a power control method provided in the embodiments of this application, and then the first node determines a first transmit power on the time resource units by using the power control method provided in the embodiments of this application. The first node may not perform power control on another time resource unit, or another power control method may be used. The time resource unit may be a slot, a subframe, a mini-slot, or the like. This is not limited in this application.

In a possible design, the time resource unit that is agreed on by the first node and the second node and that needs to be used in the power control method provided in the embodiments of this application is a time resource unit used by the first node to send downlink information to the second node through the first link, and the time resource unit is the same as a time resource unit used by the third node to send uplink information to the second node through the second link. Alternatively, the time resource unit is a time resource unit used by the first node to send downlink information to the second node through the first link, and the time resource unit is partially overlaps a time resource unit used by the third node to send uplink information to the second node through the second link.

In some technology standards or technical documents, for example, an LTE standard, power control of a downlink signal is also referred to as power allocation. In the embodiments of this application, downlink power control and downlink power allocation have a same meaning.

Figure 3:
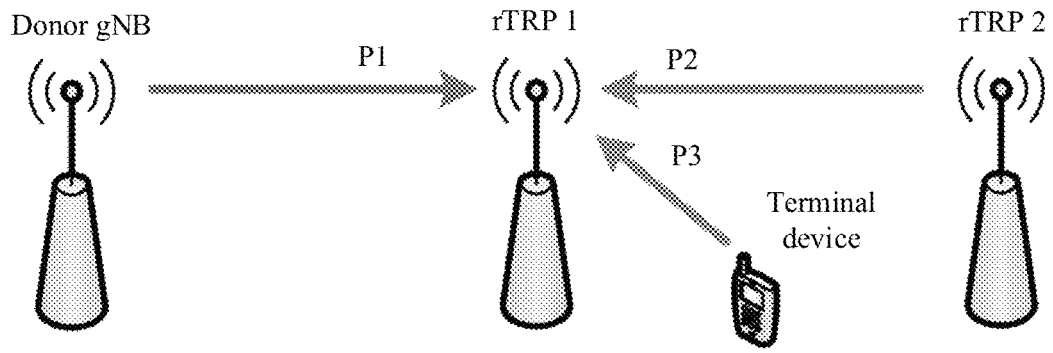
FIG. 3 is a schematic diagram in which an rTRP 1 simultaneously receives a downlink signal on a backhaul link, an uplink signal on an access link, and an uplink signal on a next-hop backhaul link according to an embodiment of this application.

As shown in FIG. 3, a DgNB does not have abundant information for performing power control on downlink transmission on a backhaul link. Therefore, it is difficult to accurately determine a transmit power of a downlink signal on the backhaul link, failing to ensure that power differences between P1, P2, and P3 are not large, and reduce interference between signals received by an rTRP 1.

Figure 4:
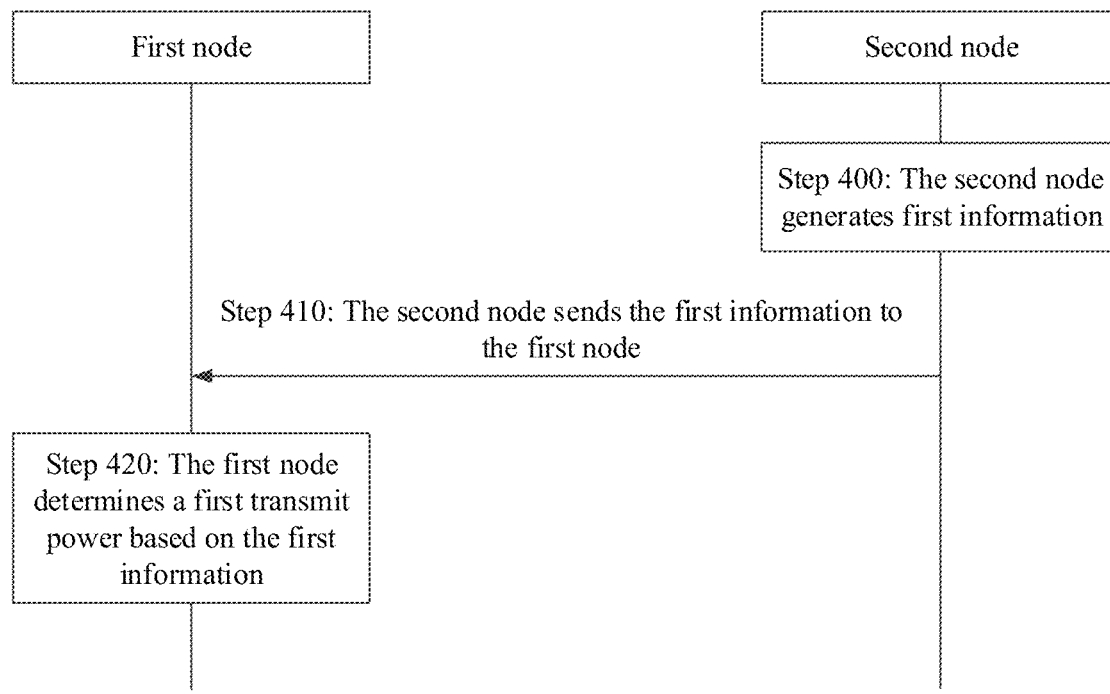
FIG. 4 is an overview flowchart of a power control method according to an embodiment of this application.

Referring to FIG. 4, an embodiment of this application provides a power control method, used to determine a transmit power of a downlink signal on a backhaul link, to reduce interference between signals received by a relay device. The method includes the following steps.

Step 400: A second node determines first information.

The first information is used to determine a first transmit power, and the first transmit power is a power used when a first node sends downlink information to the second node through a first link.

For example, as shown in FIG. 3, the first transmit power may be a power used when the DgNB sends downlink information to the rTRP 1, or may be a power used when the rTRP 1 sends downlink information to the rTRP 2.

It should be understood that the downlink information mentioned in this embodiment of this application may be downlink data.

Step 410: The second node sends the first indication information to the first node.

Step 420: The first node receives the first information, and the first node determines the first transmit power based on the first information.

Specifically, the first node may determine the first transmit power based on the first information in any one of the following four manners, but is not limited to the following four manners.

Manner 1: The first information includes a reference receive power.

The first node determines the first transmit power based on the reference receive power and a path loss measurement value corresponding to the first link.

It should be understood that the reference receive power is determined by the second node based on at least one of parameters: a preset bandwidth, a preset multiple-input multiple-output (MIMO) configuration parameter, and a preset modulation and coding scheme (MCS) value.

The preset MIMO configuration parameter may include, but is not limited to, at least one of the following parameters: a quantity of transport streams, a quantity of transmit antenna ports, a quantity of receive antenna ports, a maximum supported quantity of transport streams, a maximum supported quantity of transmit antenna ports, and the like.

It should be understood that the maximum supported quantity of transport streams and the maximum supported quantity of transmit antenna ports herein are not limited by a maximum value caused by a quantity of physical antennas (for example, if the quantity of physical antennas is eight, the maximum supported quantity of transport streams cannot exceed eight), but is determined based on a quantity of receive antennas allocated by the second node to the backhaul link, and such allocation is variable. At a particular moment, when the quantity of antennas allocated by the second node to the backhaul link changes, the maximum supported quantity of transport streams changes. Therefore, the maximum supported quantity of transport streams and the maximum supported quantity of transmit antenna ports herein are not absolute maximum values, but valid maximum values at a particular moment.

In addition, the reference receive power may alternatively be a normalized reference receive power. The normalized reference receive power may be a reference receive power for each RB, a reference receive power for each resource element (RE), or a reference receive power for each bit. Each bit herein may be a bit before encoding, or may be a bit after encoding. For example, the reference receive power may be determined when single stream transmission is performed on a single RB and one MCS value is used. Alternatively, the reference receive power may be determined for a single bit in a single stream transmission condition.

In a possible design, when the second node updates the preset MIMO configuration parameter, the second node updates the reference receive power based on the updated preset MIMO configuration parameter.

Optionally, a quantity of antennas used by the second node to receive downlink information on the backhaul link may be dynamically or semi-statically allocated. Therefore, the parameter for determining the reference receive power may also include a quantity of receive antennas. For example, the reference receive power is calculated based on that the quantity of receive antennas is two. In addition, when the quantity of antennas used to receive the backhaul link changes, an interference relationship between the backhaul link and the access link may change because changes in a tolerance capability of the backhaul link for interference of the access link and a tolerance capability of the access link for interference of the backhaul link due to a change in beamforming and a receiver algorithm caused by the quantity of antennas. In this case, the second node needs to update the reference receive power and notify the first node of the updated reference receive power.

However, parameters such as a downlink bandwidth, an MCS value, and a preset MIMO configuration parameter that are of the backhaul link and that are actually used by the first node may be different from parameters used by the second node to determine the reference receive power. Therefore, before determining the first transmit power, the first node needs to first determine an actual reference receive power based on the reference receive power, and determine the first transmit power based on the actual reference receive power and the path loss measurement value corresponding to the first link.

Specifically, the first node and the second node need to agree in advance on parameters used to determine the reference receive power. When the parameters such as the downlink bandwidth, the MCS value, and the preset MIMO configuration parameter that are of the backhaul link and that are actually used by the first node are different from the parameters used by the second node to determine the reference receive power, the actual reference receive power may be determined by scaling the reference receive power. For example, when an actual downlink bandwidth of the backhaul link is twice a preset bandwidth used by the second node to determine the reference receive power, the actual reference receive power should be twice the reference receive power determined by the second node. For another example, when an actual quantity of transport streams is twice a quantity of transport streams used by the second node to determine the reference receive power, the actual reference receive power should be half the reference transmit power determined by the second node.

The path loss measurement value corresponding to the first link may be determined by using, but not limited to, the following two methods.

Method 1: The first information further includes the path loss measurement value corresponding to the first link.

In a possible design, the path loss measurement value corresponding to the first link is determined by the second node based on a transmit power of a first signal sent by the first node and a receive power of the first signal obtained by the second node through measurement.

The first signal is any one of the following signals: a demodulation reference signal (DMRS), a channel state information reference signal (CSI-RS), or a synchronization signal.

It should be understood that the first node has notified the second node of the transmit power of the first signal. Optionally, the transmit power of the first signal herein refers to energy per resource element (EPRE).

Method 2: The path loss measurement value corresponding to the first link is determined by the first node based on a transmit power of a second signal sent by the second node and a receive power of the second signal obtained by the first node through measurement.

The second signal is any one of the following signals: a sounding reference signal (SRS), a DMRS, a CSI-RS, or a synchronization signal.

It should be understood that the transmit power of the second signal may be configured by the first node, or may be configured by the second node and notified to the first node. Optionally, the transmit power of the second signal herein refers to EPRE.

For example, when the second node is a relay device, the second node sends a CSI-RS and a synchronization signal. In this case, the first node may measure the CSI-RS or the synchronization signal sent by the second node, to determine the path loss measurement value corresponding to the first link.

Manner 2: The first information includes a power adjustment value.

The first node determines an adjusted first transmit power based on a latest used first transmit power and power adjustment value.

The latest first transmit power used by the first node may be a transmit power used when the first node sends downlink information to the second node through the first link last time. The power adjustment value is determined by the second node based on a receive power of a preset signal and a reference receive power that are obtained through measurement, and the preset signal is a signal that carries latest downlink information sent once or a plurality of times by the first node to the second node through the first link, or a reference signal sent by the first node to the second node.

The reference receive power is the reference receive power in the manner 1. Repeated parts are not described again. For a manner of determining the receive power of the preset signal, reference also needs to be made to the parameter used by the second node to determine the reference receive power in the manner 1, and the receive power of the preset signal is determined in a manner in which based on the parameter used by the second node to determine the reference receive power, the preset signal is measured or a measurement result of the preset signal is scaled. Therefore, when parameters such as a downlink bandwidth, an MCS value, and a preset MIMO configuration parameter that are of the backhaul link and that are actually used by the first node are different from parameters used by the second node to determine the reference receive power, the power adjustment value also needs to be determined by scaling a difference between the receive power of the preset signal and the reference receive power. For a specific method, refer to the method for determining the actual reference receive power based on the reference receive power in the manner 1. It should be understood that the method for determining the power adjustment value provided in this embodiment of this application is merely an example, and the power adjustment value may also be determined in another manner.

In addition, a reporting time of the power adjustment value may be determined by the second node. For example, when an absolute value of a difference between the receive power of the preset signal and the reference receive power exceeds a preset threshold, the second node determines the power adjustment value, and reports the power adjustment value to the first node. Alternatively, the first node may configure a reporting time of the power adjustment value for the second node. For example, the first node configures that the second node periodically reports the power adjustment value.

It should be understood that, when the preset signal is a reference signal sent by the first node to the second node, there should be a determined association relationship between a transmit power of the reference signal and the first transmit power. For example, the transmit power of the reference signal is equal to or differs by a fixed difference from the first transmit power. The reference signal may be a CSI-RS used for CSI measurement or a DMRS. Optionally, the transmit power of the reference signal herein refers to EPRE.

For example, it is assumed that the power adjustment value is determined based on a reference signal sent by the first node to the second node, and a transmit power of the reference signal is equal to or has a preset difference from the first transmit power, the first node determines the adjusted first transmit power based on the latest used first transmit power and power adjustment value.

Manner 3: The first information includes a power control parameter $P_0$, a path loss compensation coefficient $\alpha$ corresponding to the first link, and a power adjustment value. The power adjustment value is used to update an accumulated value f of the power adjustment value.

The first node determines the first transmit power $P_{BH}$ according to the following formula:

$$P_{BH} = \min\left\{ \begin{array}{l} P_{CMAX}, \\ 10\log_{10}(M_{BH}) + P_0 + \alpha \cdot PL + \Delta_{TF} + f \end{array} \right\},$$

where $P_{CMAX}$ is a maximum downlink transmit power corresponding to the first link, $M_{BH}$ is a downlink bandwidth corresponding to the first link in a unit of a physical resource block (PRB), $\Delta_{TF}$ is a correction value of a preset modulation and coding scheme, and PL is the path loss measurement value corresponding to the first link.

In these parameters, $P_{CMAX}$ refers to a maximum value of a downlink transmit power of the first link. If the first node simultaneously performs transmission on another link (for example, downlink transmission on an access link), $P_{CMAX}$ includes only a part of a total transmit power supported by the first node. $P_0$ is a metric value that reflects an expected power of a received signal, and $P_0$ may be determined based on the prior art, for example, a method for determining a related parameter in power control on uplink signal transmission. This is not limited in this embodiment of this application.

The power adjustment value is the power adjustment value in the manner 2. Repeated parts are not described again.

Specifically, $P_0$, $\alpha$, and the power adjustment value may be reported by using radio resource control (RRC) signaling, or may be reported by using an X2 interface.

Manner 4: The first information includes a power control parameter $P_0$ and a path loss compensation coefficient $\alpha$ corresponding to the first link.

The first node determines the first transmit power $P_{BH}$ according to the following formula:

$$P_{BH} = \min\left\{ \begin{array}{l} P_{CMAX}, \\ 10\log_{10}(M_{BH}) + P_0 + \alpha \cdot PL + \Delta_{TF} \end{array} \right\},$$

where $P_{CMAX}$ is a maximum downlink transmit power corresponding to the first link, $M_{BH}$ is a downlink bandwidth corresponding to the first link, $\Delta_{TF}$ is a correction value of a preset modulation and coding scheme, and PL is a path loss measurement value corresponding to the first link. Specific meanings of these parameters are the same as those in the manner 3.

For the foregoing manner 3 and manner 4, the manner 3 is a closed-loop power control manner, and the manner 4 is an open-loop power control manner. It should be noted that the path loss measurement value PL corresponding to the first link in the foregoing manner 3 and manner 4 may be determined by using the method for determining the path loss measurement value corresponding to the first link in the manner 1. Repeated parts are not described again.

In addition, because the second node also performs power control on a transmit power of an uplink signal sent by a terminal device in a cell of the second node, and uplink power control parameters include $P_{O\_PUSCH,c}(j)$ and $\alpha_c(j)$, the second node may select to report both downlink power control parameters (including $P_0$ and $\alpha$) on the backhaul link and uplink power control parameters (including $P_{O\_PUSCH,c}(j)$ and $\alpha_c(j)$) on the access link. In this case, the two types of parameters need to be distinguished in a control field. Optionally, $P_0 = P_{O\_PUSCH,c}(j)$, and $\alpha = \alpha_c(j)$. Therefore, the second node only needs to report a group of values to the first node. For example, the first information includes $P_0$ and $\alpha$, and the first node considers by default that the downlink power control parameters on the backhaul link are the same as the uplink power control parameters on the access link.

In conclusion, in the foregoing four manners, the first node determines the first transmit power based on the first information, and the first transmit power is used as the transmit power of the downlink signal on the backhaul link, thereby avoiding mutual interference between downlink transmission on the backhaul link and uplink transmission on the access link or uplink transmission on the next-hop backhaul link.

It should be understood that, in a possible design, the first transmit power is the same as or differs by a preset threshold from a power used when the first node sends a reference signal or control information to the second node. Optionally, the transmit power of the reference signal herein refers to EPRE.

The reference signal herein may be at least one of the following: a DMRS, a tracking reference signal (TRS), a phase tracking reference signal (PTRS), and a CSI-RS used to obtain CSI.

Optionally, the preset threshold herein is determined based on a quantity of ports of the reference signal and a quantity of transport streams corresponding to the downlink information.

It should be understood that, when the first node configures a plurality of reference signals, there is a need to distinguish, in configuration signaling, whether the reference signals are transmitted in a time resource unit for downlink transmit power control, that is, whether the time resource unit is a time resource unit multiplexed for the downlink transmission on the backhaul link and the uplink transmission on the access link.

In addition, it should be noted that the first transmit power is not used as a transmit power of a CSI-RS used for beam measurement, a CSI-RS used for mobility management, and a CSI-RS used for link quality monitoring, and a transmit power of a signal that has no association relationship with a channel carrying the downlink information. The transmit powers may be directly configured by the first node.

Therefore, reference signals sent by the first node to the second node may be classified into two types. One type is a signal that has an association relationship with the channel carrying the downlink information, and a transmit power of such a reference signal is the same as or differs by a preset threshold from the first transmit power, to help the second node obtain, based on such the reference signal, an accurate measurement result of the channel carrying the downlink information. The other type is a signal that has no association relationship with the channel carrying the downlink information. A reason why the first transmit power is not used as a transmit power of such a reference signal is that relatively good signal coverage of such the reference signal needs to be ensured, and the transmit power of such the reference signal is better not randomly changed. However, the first node performs power control on the first transmit power, so that the first transmit power may change frequently, and when the first transmit power is excessively low, a coverage requirement of such the reference signal may not be met.

Figure 5:
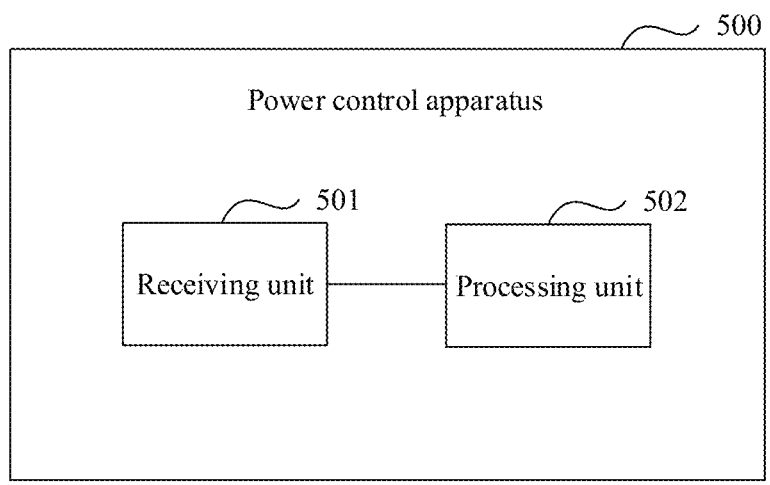
FIG. 5 is a first schematic structural diagram of a power control apparatus according to an embodiment of this application.

Based on the foregoing embodiment, an embodiment of this application provides a power control apparatus. As shown in FIG. 5, the apparatus 500 includes:

a receiving unit 501, configured to receive first information sent by a second node, where the first information is used to determine a first transmit power, the first transmit power is a power used when the apparatus sends downlink information to the second node through a first link, the first link is a link between the apparatus and the second node, and the apparatus is an upper-level device of the second node; and a processing unit 502, configured to determine the first transmit power based on the first information.

In a possible design, the first information includes a reference receive power or a power adjustment value.

In a possible design, the first information includes a power control parameter $P_0$, a path loss compensation coefficient $\alpha$ corresponding to the first link, and a power adjustment value. The power adjustment value is used to update an accumulated value f of the power adjustment value.

In a possible design, the processing unit 502 is specifically configured to:

determine the first transmit power $P_{BH}$ according to the following formula:

$$P_{BH} = \min\left\{ \begin{array}{l} P_{CMAX}, \\ 10\log_{10}(M_{BH}) + P_0 + \alpha \cdot PL + \Delta_{TF} + f \end{array} \right\},$$

where $P_{CMAX}$ is a maximum downlink transmit power corresponding to the first link, $M_{BH}$ is a downlink bandwidth corresponding to the first link, $\Delta_{TF}$ is a correction value of a preset modulation and coding scheme, and PL is a path loss measurement value corresponding to the first link.

In a possible design, the first information includes a power control parameter $P_0$ and a path loss compensation coefficient $\alpha$ corresponding to the first link.

In a possible design, the processing unit 502 is specifically configured to:

determine the first transmit power $P_{BH}$ according to the following formula:

$$P_{BH} = \min\left\{ \begin{array}{l} P_{CMAX}, \\ 10\log_{10}(M_{BH}) + P_0 + \alpha \cdot PL + \Delta_{TF} \end{array} \right\},$$

where $P_{CMAX}$ is a maximum downlink transmit power corresponding to the first link, $M_{BH}$ is a downlink bandwidth corresponding to the first link, $\Delta_{TF}$ is a correction value of a preset modulation and coding scheme, and PL is a path loss measurement value corresponding to the first link.

In a possible design, the first information further includes the path loss measurement value PL corresponding to the first link.

In a possible design, the first transmit power is the same as or differs by a preset threshold from a power used when the apparatus sends a reference signal or control information to the second node.

In a possible design, a time resource unit used by the apparatus to send the downlink information to the second node through the first link is the same as a time resource unit used by a third node to send uplink information to the second node through a second link.

The second link is a link between the second node and the third node, and the third node is a lower-level node of the second node or a terminal device.

It may be understood that, for a specific implementation and a corresponding beneficial effect of a functional module included in the power control apparatus in FIG. 5, refer to a specific description of the foregoing embodiment shown in FIG. 4. Details are not described herein.

Figure 6:
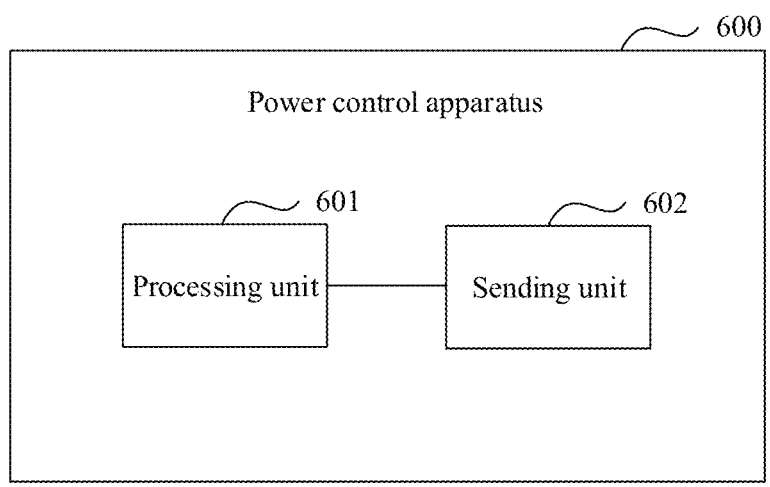
FIG. 6 is a second schematic structural diagram of a power control apparatus according to an embodiment of this application.

Based on the foregoing embodiment, an embodiment of this application provides a power control apparatus. As shown in FIG. 6, the apparatus 600 includes:

a processing unit 601, configured to determine first information, where the first information is used to determine a first transmit power, the first transmit power is a power used when the first node sends downlink information to the second node through a first link, the first link is a link between the first node and the second node, and the first node is an upper-level device of the second node; and a sending unit 602, configured to send the first information to the first node.

In a possible design, the first information is a reference receive power or a power adjustment value.

In a possible design, the first information includes a power control parameter $P_O$, a path loss compensation coefficient $\alpha$ corresponding to the first link, and a power adjustment value. The power adjustment value is used to update an accumulated value f of the power adjustment value.

In a possible design, the first information includes a power control parameter $P_O$ and a path loss compensation coefficient $\alpha$ corresponding to the first link.

In a possible design, the first information further includes a path loss measurement value PL corresponding to the first link.

In a possible design, the processing unit 601 is further configured to:

update a preset multiple-input multiple-output MIMO configuration parameter; and update the reference receive power based on the updated preset MIMO configuration parameter.

In a possible design, a time resource unit used by the power control apparatus to send the downlink information to the second node through the first link is the same as or partially overlaps a time resource unit used by a third node to send uplink information to the second node through a second link.

The second link is a link between the second node and the third node, and the third node is a lower-level node of the second node or a terminal device.

It may be understood that, for a specific implementation and a corresponding beneficial effect of a functional module included in the power control apparatus in FIG. 6, refer to a specific description of the foregoing embodiment shown in FIG. 4. Details are not described herein.

It should be understood that division of the foregoing units is merely logical function division. During actual implementation, all or some of the units may be integrated into one physical entity, or may be physically separate. In addition, the units all may be implemented by software invoked by a processing element, or all may be implemented by hardware, or some units may be implemented by software invoked by a processing element, and some units may be implemented by hardware. In an implementation process, steps in the foregoing method or the foregoing units can be completed by using a hardware integrated logical circuit in a processing element, or by using an instruction in a form of software.

For example, during hardware implementation, the foregoing processing unit may be a processor, a processing circuit, or the like; the sending unit may be a transmitter, a transmitter circuit, or the like; and the receiving unit may be a receiver, a receiver circuit, or the like. The sending unit and the receiving unit may form a communications interface.

For example, the foregoing units may be one or more integrated circuits configured to implement the foregoing method, for example, one or more application-specific integrated circuits (ASIC), one or more microprocessors (DSP), or one or more field programmable gate arrays (FPGA). For another example, when one of the foregoing units is implemented by a processing element invoking a program, the processing element may be a general-purpose processor, such as a central processing unit (CPU) or another processor that can invoke a program. For another example, the units can be integrated together and implemented in a form of a system-on-a-chip (SOC).

Figure 7:
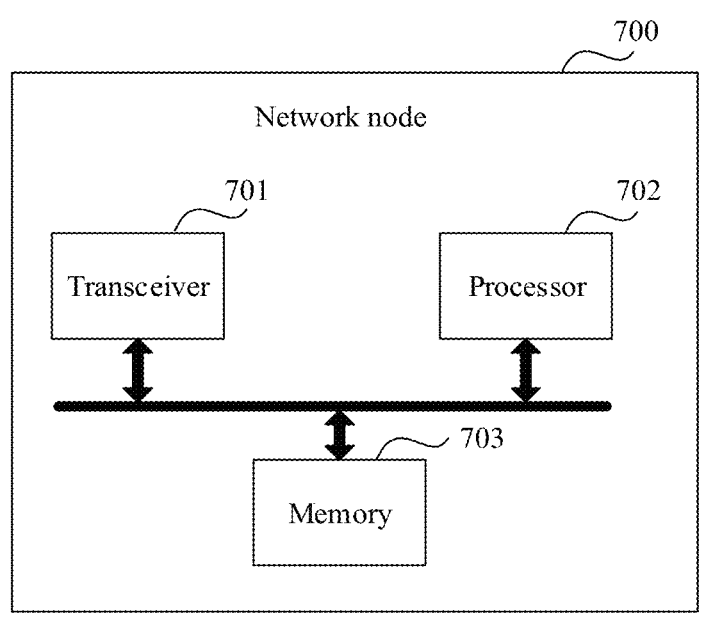
FIG. 7 is a schematic structural diagram of a network node according to an embodiment of this application.

Based on the foregoing embodiment, an embodiment of this application further provides a network node. The network node may be the first node or the second node in the embodiment shown in FIG. 4. Referring to FIG. 7, the network node 700 includes a transceiver 701, a processor 702, and a memory 703. The memory 703 is configured to store a computer program, and the processor 702 invokes the computer program stored in the memory 703, to perform, by using the transceiver 701, the method shown in FIG. 4.

It may be understood that the power control apparatus in the embodiments shown in FIG. 5 and FIG. 6 may be implemented by the network node 700 shown in FIG. 7. A structure of the network node 700 does not constitute any limitation to the embodiments of this application.

In FIG. 7, the processor 702 may be a CPU, a network processor (NP), a hardware chip, or any combination thereof. The memory 703 may include a volatile memory, for example, a random access memory (RAM). The memory may also include a non-volatile memory, for example, a read-only memory (ROM), a flash memory, a hard disk (HDD) or a solid-state drive (SSD). The memory 703 may further include a combination of the foregoing types of memories.

An embodiment of this application further provides a network node. The network node includes a processor.

In this embodiment of this application, the processor is configured to control and manage an action of the network node. For example, the processor is configured to support related steps of determining the first transmit power by the first node in the embodiment shown in FIG. 4. Optionally, the network node may further include a memory and a communications interface. The processor, the communications interface, and the memory may be connected to each other or connected to each other by using a bus. The memory is configured to store code and data of the network node. The communications interface is configured to support the network node in communication.

The processor may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. The processor may alternatively be a combination of processors implementing a computing function, for example, a combination of one or more microprocessors, or a combination of a digital signal processor and a microprocessor.

In conclusion, the embodiments of this application provide a mechanism for performing power control on downlink signal transmission on the backhaul link, to reduce interference between the signals received by the relay device. The first node determines the first transmit power based on the first information sent by the second node, and the first node uses the first transmit power when sending the downlink information to the second node through the first link, thereby avoiding mutual interference between the downlink transmission on the backhaul link, the uplink transmission on the access link or the uplink transmission in the next-hop backhaul link.

A person skilled in the art should understand that the embodiments of this application may be provided as a method, a system, or a computer program product. Therefore, the embodiments of this application may be in a form of hardware only embodiments, software only embodiments, or embodiments with a combination of software and hardware. Moreover, the embodiments of this application may be in a form of the computer program product that is implemented on one or more computer-usable storage media (including but not limited to a magnetic disk storage, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that a computer program instruction may be used to implement each process and/or each block in the flowcharts and/or the block diagrams and a combination of a process and/or a block in the flowcharts and/or the block diagrams. The computer program instructions may be provided for a general-purpose computer, a special-purpose computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

The computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to the embodiments of this application without departing from the spirit and scope of this application. This application is intended to cover these modifications and variations provided that these modifications and variations to the embodiments of this application fall within the scope of the claims of this application and their equivalent technologies.

The invention claimed is:

1. A power control method, comprising:
receiving, by a first node, first information from a second node, wherein the first information is used to determine first transmit power, the first transmit power is used by the first node for sending downlink information to the second node via a first link, the first link is a link between the first node and the second node, and the first node is an upper-level node of the second node;
determining, by the first node, the first transmit power based on the first information; and
sending, by the first node using the first transmit power, the downlink information to the second node in a first slot, wherein the first slot is a slot agreed by the first node and the second node in which power control needs to be performed, and the first slot is a multiplexing slot in which downlink transmission is performed by using the first link and uplink transmission is performed by using a second link, wherein the second link is a link between the second node and a third node, and the third node is a lower-level node of the second node or a terminal device.

2. The method of claim 1, wherein the first information comprises a reference received power or a power adjustment value.

3. The method according to claim 1, wherein:
the first transmit power is the same as a power used by the first node for sending a reference signal or control information to the second node; or
the first transmit power differs by a preset threshold from the power used by the first node for sending the reference signal or the control information to the second node.

4. The method according to claim 3, wherein the reference signal is at least one of a demodulation reference signal (DMRS), a tracking reference signal (TRS), a phase tracking reference signal (PTRS), or a channel state information reference signal (CSI-RS) used for obtaining channel state information (CSI).

5. The method according to claim 1, wherein the first transmit power is not used for transmit power of a signal that has no association relationship with a channel carrying the downlink information.

6. The method according to claim 1, wherein the downlink information is downlink data.

7. A power control method, comprising:
determining, by a second node, first information, wherein the first information is used to determine first transmit power, the first transmit power is used by a first node for sending downlink information to the second node via a first link, the first link is a link between the first node and the second node, and the first node is an upper-level node of the second node;
sending, by the second node, the first information to the first node; and
receiving, by the second node, the downlink information from the first node in a first slot and uplink information from a third node over a second link, wherein the first slot is a slot agreed by the first node and the second node in which power control needs to be performed, the first slot is a multiplexing slot in which downlink transmission is performed by using the first link and uplink transmission is performed by using the second link, and the second link is a link between the second node and the third node, and the third node is a lower-level node of the second node or a terminal device.

8. The method according to claim 7, wherein the first information is a reference receive power or a power adjustment value.

9. The method according to claim 7, wherein the downlink information is downlink data.

10. The method according to claim 7, further comprising:
updating, by the second node, a preset multiple-input multiple-output (MIMO) configuration parameter; and
updating, by the second node, a reference receive power according to the updated preset (MIMO) configuration parameter.

11. A first node, comprising:
a transceiver, configured to receive first information from a second node, wherein the first information is used to determine first transmit power, the first transmit power is used by the first node for sending downlink information to the second node via a first link, the first link is a link between the first node and the second node, and the first node is an upper-level node of the second node;
a processor, configured to determine the first transmit power based on the first information; and
the transceiver is further configured to send, using the first transmit power, the downlink information to the second node in a first slot, wherein the first slot is a slot agreed by the first node and the second node in which power control needs to be performed, and the first slot is a multiplexing slot in which downlink transmission is performed by using the first link and uplink transmission is performed by using a second link, wherein the second link is a link between the second node and a third node, and the third node is a lower-level node of the second node or a terminal device.

12. The first node of claim 11, wherein the first information comprises a reference received power or a power adjustment value.

13. The first node according to claim 11, wherein:
the first transmit power is the same as a power used by the first node for sending a reference signal or control information to the second node; or
the first transmit power differs by a preset threshold from the power used by the first node for sending the reference signal or the control information to the second node.

14. The first node according to claim 13, wherein the reference signal is at least one of a demodulation reference signal (DMRS), a tracking reference signal (TRS), a phase tracking reference signal (PTRS), or a channel state information reference signal (CSI-RS) used for obtaining channel state information (CSI).

15. The first node according to claim 11, wherein the first transmit power is not used for transmit power of a signal that has no association relationship with a channel carrying the downlink information.

16. The first node according to claim 11, wherein the downlink information is downlink data.

17. A second node, comprising:
a processor, configured to determine first information, wherein the first information is used to determine first transmit power, the first transmit power is used by a first node for sending downlink information to the second node via a first link, the first link is a link between the first node and the second node, and the first node is an upper-level node of the second node;
a transceiver, configured to:
send the first information to the first node; and
receive the downlink information from the first node in a first slot and uplink information from a third node over a second link, wherein the first slot is a slot agreed by the first node and the second node in which power control needs to be performed, the first slot is a multiplexing slot in which downlink transmission is performed by using the first link and uplink transmission is performed by using the second link, and the second link is a link between the second node and the third node, and the third node is a lower-level node of the second node or a terminal device.

18. The second node according to claim 17, wherein the first information is a reference receive power or a power adjustment value.

19. The second node according to claim 17, wherein the downlink information is downlink data.

20. The second node according to claim 17, wherein the processor is further configured to:
update a preset multiple-input multiple-output (MIMO) configuration parameter; and
update a reference receive power according to the updated preset (MIMO) configuration parameter.

* * * * *